(12) United States Patent
LeBlanc et al.

(10) Patent No.: US 10,346,119 B2
(45) Date of Patent: Jul. 9, 2019

(54) TRUSTED VEHICLE MESSAGING VIA TRANSPARENT DISPLAY

(71) Applicant: Intel Corporation, Santa Clara, CA (US)

(72) Inventors: Darrell Norman LeBlanc, Portland, OR (US); Laura M. Rumbel, Portland, OR (US); Ignacio J. Alvarez, Portland, OR (US); Jennifer L. Edmondson, Gilbert, CA (US); Adam Jordan, El Cerrito, CA (US); Juliana L. Knopf, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/277,102

(22) Filed: Sep. 27, 2016

(65) Prior Publication Data

US 2018/0088887 A1     Mar. 29, 2018

(51) Int. Cl.
*G06F 3/14*     (2006.01)
*B60R 11/02*     (2006.01)
(Continued)

(52) U.S. Cl.
CPC ........ *G06F 3/1431* (2013.01); *B60R 11/0235* (2013.01); *G06F 3/147* (2013.01); *G06F 3/1423* (2013.01); *G06F 21/445* (2013.01); *G06Q 30/0265* (2013.01); *G09G 3/3208* (2013.01); *G06F 21/32* (2013.01); *G06F 21/35* (2013.01); *G07B 15/00* (2013.01); *G09G 2320/028* (2013.01); *G09G 2320/0626* (2013.01); *G09G 2354/00* (2013.01); *G09G 2358/00* (2013.01); *G09G 2360/04* (2013.01); *G09G 2380/02* (2013.01); *G09G 2380/10* (2013.01)

(58) Field of Classification Search
None
See application file for complete search history.

(56) References Cited

U.S. PATENT DOCUMENTS 5,854,661 A * 12/1998 Kochanski ............... G09G 5/00
                                             345/102
7,126,583 B1 * 10/2006 Breed ..................... B60K 35/00
                                             345/158

(Continued)

FOREIGN PATENT DOCUMENTS

KR      200399927 Y1     11/2005
KR      101539774 B1     7/2015
KR      20160057458 A     5/2016

OTHER PUBLICATIONS

Login Directly Into Windows 7 Without Entering Password by Aun _ Jul. 21, 2009 https://www.addictivetips.com/windows-tips/login-directly-into-windows-7-without-entering-password/.*

(Continued)

*Primary Examiner* — Jason A Pringle-Parker
(74) *Attorney, Agent, or Firm* — Jordan IP Law, LLC

(57) ABSTRACT

Systems, apparatuses, and methods for trusted vehicle messaging may include receiving a communication from one or more of an internal vehicle component or an external communication system and composing a trusted message to be displayed in response to the received communication. Content may be managed to be displayed on one or more displays supported by a body of a vehicle.

24 Claims, 4 Drawing Sheets

(51) Int. Cl.
*G06F 21/32* (2013.01)
*G06F 21/35* (2013.01)
*G06F 21/44* (2013.01)
*G06F 3/147* (2006.01)
*G06Q 30/02* (2012.01)
*G07B 15/00* (2011.01)
*G09G 3/3208* (2016.01)

(56) References Cited

U.S. PATENT DOCUMENTS

| | | | | |
|---|---|---|---|---|
| 7,602,773 | B2* | 10/2009 | Frank | H04L 12/28 |
| | | | | 370/381 |
| 7,866,861 | B2* | 1/2011 | Alexander | B60Q 1/268 |
| | | | | 362/503 |
| 9,443,152 | B2* | 9/2016 | Atsmon | H04N 7/185 |
| 9,472,939 | B1* | 10/2016 | Hart | H02G 11/00 |
| 2004/0064728 | A1* | 4/2004 | Scheurich | G06F 21/32 |
| | | | | 726/9 |
| 2005/0005488 | A1* | 1/2005 | Burke | G09F 21/04 |
| | | | | 40/591 |
| 2005/0289345 | A1* | 12/2005 | Haas | G07D 7/0006 |
| | | | | 713/170 |
| 2009/0201589 | A1* | 8/2009 | Freeman | G02B 27/0103 |
| | | | | 359/630 |
| 2010/0022217 | A1* | 1/2010 | Ketari | H04M 1/6066 |
| | | | | 455/411 |
| 2011/0164047 | A1* | 7/2011 | Pance | G06F 1/1647 |
| | | | | 345/581 |
| 2011/0320256 | A1* | 12/2011 | Florucci | G06Q 30/0226 |
| | | | | 705/14.33 |
| 2012/0105428 | A1* | 5/2012 | Fleck | G06F 3/1431 |
| | | | | 345/419 |
| 2013/0065614 | A1* | 3/2013 | Jung | H04M 1/72522 |
| | | | | 455/456.3 |
| 2013/0271378 | A1* | 10/2013 | Hulford | G06F 3/14 |
| | | | | 345/168 |
| 2013/0300911 | A1* | 11/2013 | Beckman | G02B 27/0101 |
| | | | | 348/335 |
| 2013/0307706 | A1* | 11/2013 | Kriezman | B60Q 1/503 |
| | | | | 340/988 |
| 2014/0005860 | A1 | 1/2014 | Chance | |
| 2015/0116977 | A1* | 4/2015 | Le Sage | B60Q 1/503 |
| | | | | 362/19 |
| 2015/0220991 | A1* | 8/2015 | Butts | G06Q 30/0265 |
| | | | | 705/14.62 |
| 2015/0264509 | A1* | 9/2015 | Oishi | G06F 3/165 |
| | | | | 381/303 |
| 2016/0236612 | A1 | 8/2016 | Caron | |

OTHER PUBLICATIONS

Alvarez, et al. "The Insight—Prototype—Product Cycle: Best practices and processes to iteratively advance in-vehicle interactive experiences development," Intel Corporation, Santa Clara, CA, USA, 27 pages (2016).

International Search Report and Written Opinion for International Patent Application No. PCT/US2017/048208, dated Nov. 7, 2017, 16 pages.

International Preliminary Report on Patentability for International Patent Application No. PCT/US2017/048208, dated Apr. 11, 2019, 14 pages.

* cited by examiner

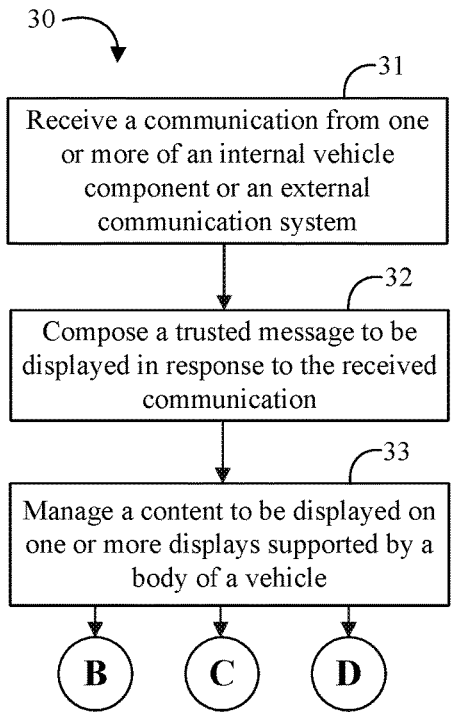
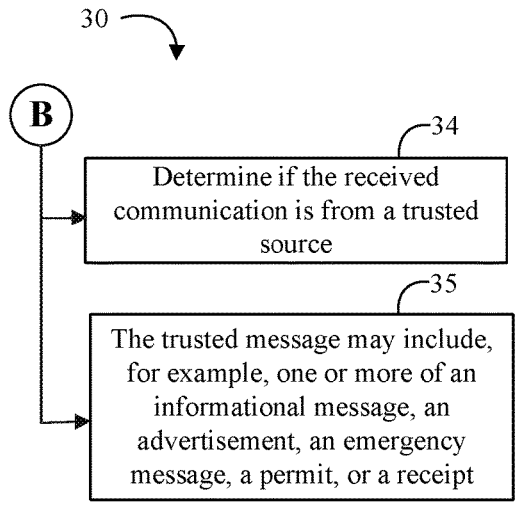
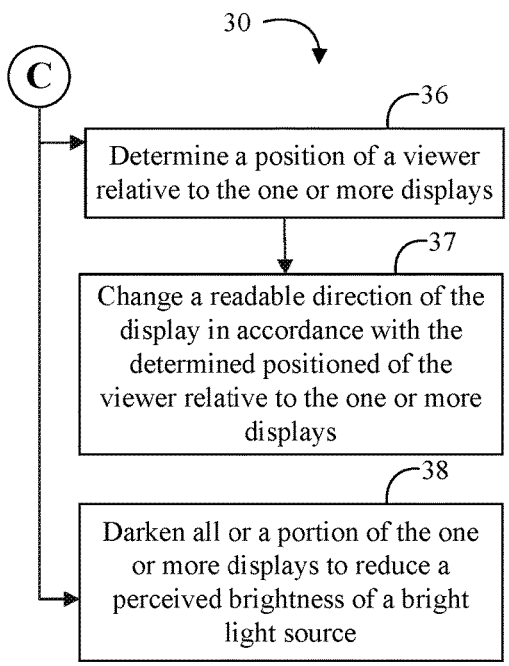
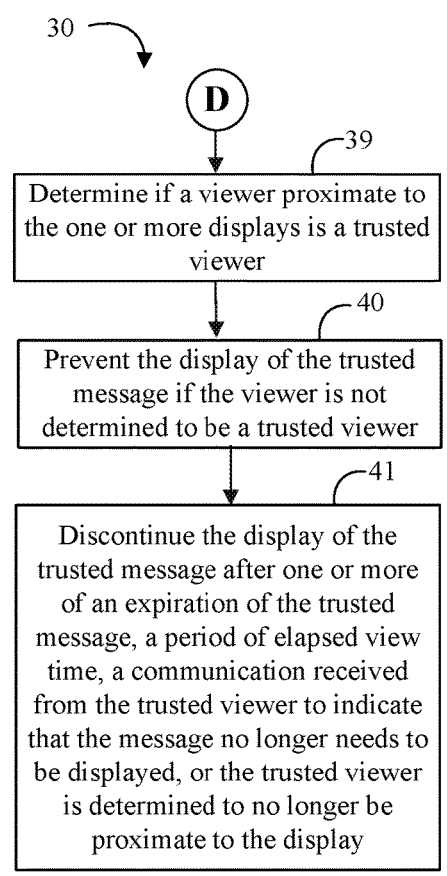
FIG. 3A
FIG. 3B
FIG. 3C
FIG. 3D

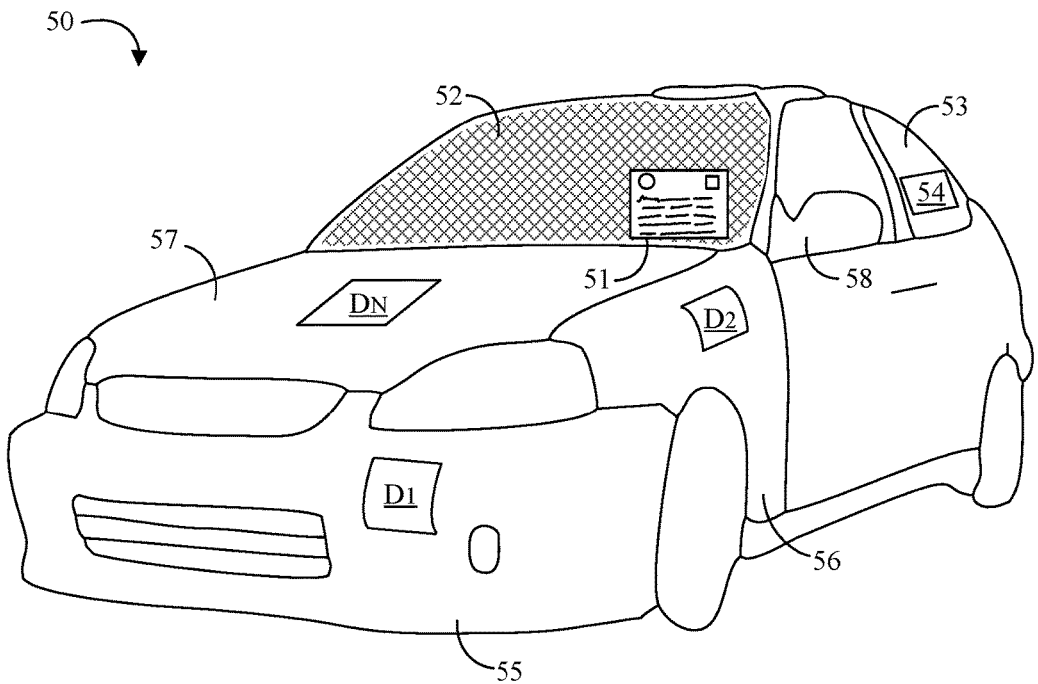
FIG. 4A
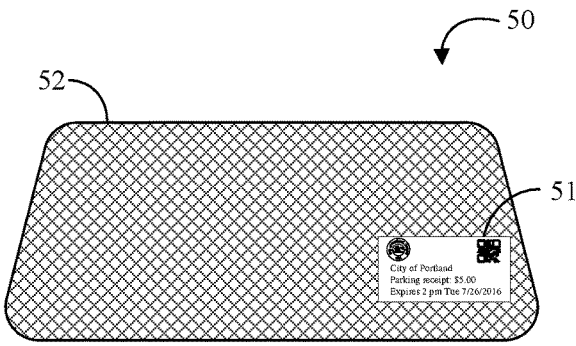
FIG. 4B
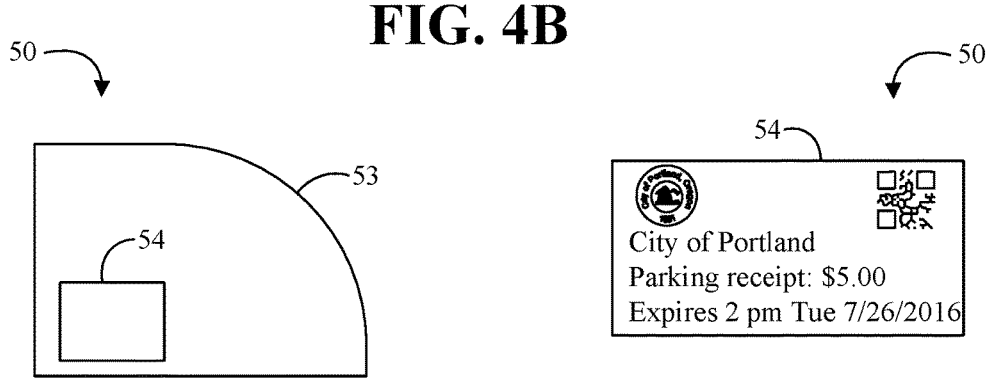
FIG. 4C  FIG. 4D

TRUSTED VEHICLE MESSAGING VIA TRANSPARENT DISPLAY

TECHNICAL FIELD

Embodiments generally relate to vehicle electronics. More particularly, embodiments relate to a system, apparatus, and methods for trusted vehicle messaging.

BACKGROUND

An owner or a driver of a vehicle may want or need to communicate information to people outside of the vehicle. These communications may take the form of printed or written notes. For example, a driver may receive a receipt for a parking fee or a parking permit which needs to be visible to a parking attendant or parking enforcement officer. Other situations may arise where a driver or an owner may want to leave a note for people around the vehicle.

BRIEF DESCRIPTION OF THE DRAWINGS

The various advantages of the embodiments will become apparent to one skilled in the art by reading the following specification and appended claims, and by referencing the following drawings, in which:

FIGS. 3A to 3D are flowcharts of an example of a method of trusted vehicle messaging according to an embodiment;

FIG. 4A is a perspective of a vehicle including an example of a trusted vehicle message system according to an embodiment;

FIG. 4B is an illustration of an example of a vehicle windshield according to an embodiment;

FIG. 4C is an illustration of an example of a vehicle door glass according to an embodiment; and FIG. 4D is an illustration of an example of a display device according to an embodiment;

DESCRIPTION OF EMBODIMENTS

Figure 1:
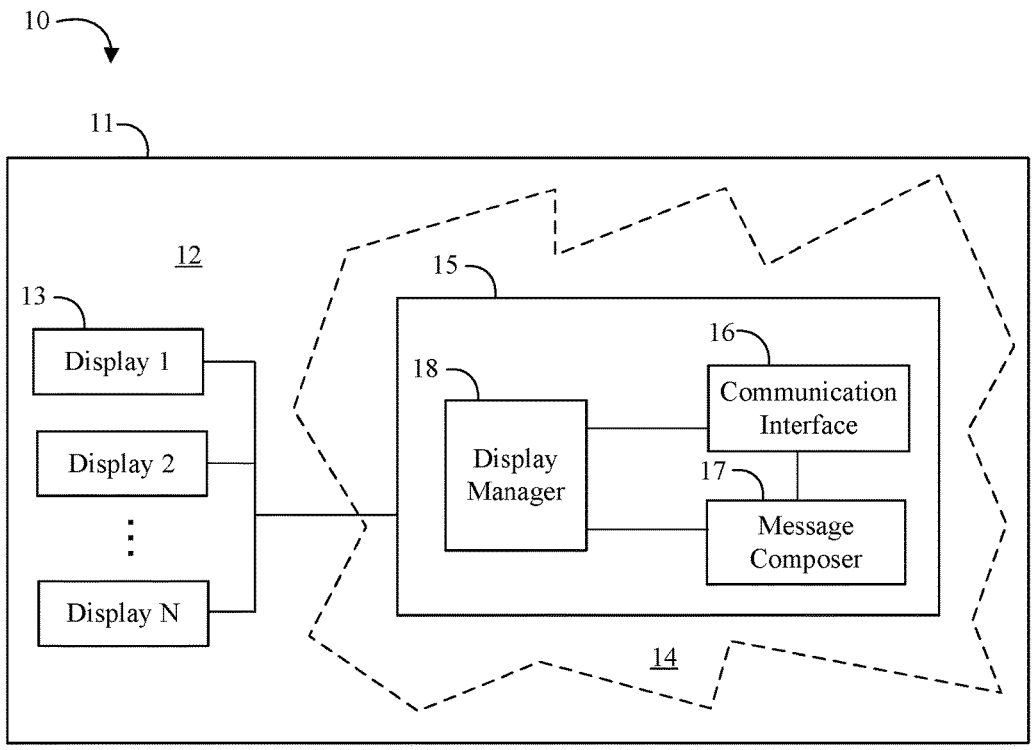
FIG. 1 is a block diagram of an example of a trusted vehicle message system according to an embodiment.

Turning now to FIG. 1, a trusted vehicle message system 10 may include a vehicle body 11 having one or more body parts 12, one or more displays 13 supported by the one or more body parts 12 of the vehicle body 11 and positioned to be readable from outside the vehicle body 11, and a vehicle computer 15 disposed inside the vehicle body 11 (e.g. an interior portion 14 of the vehicle body 11 represented as a dashed line cut-away). The vehicle computer 15 may include a communication interface 16 to receive a communication from one or more of an internal vehicle component or an external communication system, a message composer 17 communicatively coupled to the communication interface 16 to compose a message to be displayed in response to the received communication, and a display manager 18 communicatively coupled to the communication interface 16, the message composer 17, and the one or more displays 13 to manage a content to be displayed on the one or more displays 13. For example, the one or more body parts 12 may include a curved windshield and the one or more displays 13 may include a substantially transparent flexible organic light emitting diode (OLED) display affixed to the curved windshield. In some embodiments of the system 10, the flexible OLED display may cover substantially an entire surface of the curved windshield. The one or more body parts 12 may also include, for example, other exterior body parts, a dashboard, or rear window ledge of the vehicle.

In some embodiments, the displays may be affixed to exterior surfaces of exterior body parts. Alternatively, the displays may be affixed to interior surfaces of the exterior body part but may be readable from outside the vehicle (e.g. through a vehicle glass body part or a cutout in the exterior body part). In either alternative, the display may be readable when a viewer is facing the external surface of the exterior body part to which the display may be affixed. Embodiments of the system 10 utilizing a flexible OLED display may be particularly advantageous because many of a vehicle surfaces (e.g. the windshield) are not flat. In addition, embodiments utilizing a transparent OLED display may advantageously allow for the windshield (e.g., or other exterior glass) to be become a multifunction surface (as described in further detail below).

Non-limiting examples of vehicles which may utilize the trusted vehicle messaging system 10 include an automobile, a truck, a bus, a motorcycle, a boat, an airplane, a helicopter, and a drone. Non-limiting examples of suitable display technologies for the trusted vehicle messaging system 10 include liquid crystal display (LCD), light emitting diode (LED) display, OLED display, thin film display, projection display, and/or electronic ink display, including transparent displays and/or flexible displays. Multiple display technologies may be utilized in one system 10 in accordance with which display technology is best suited to a particular vehicle surface location or system application.

Embodiments of each of the above vehicle computer 15, communication interface 16, message composer 17, display manager 18, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages.

Figure 2:
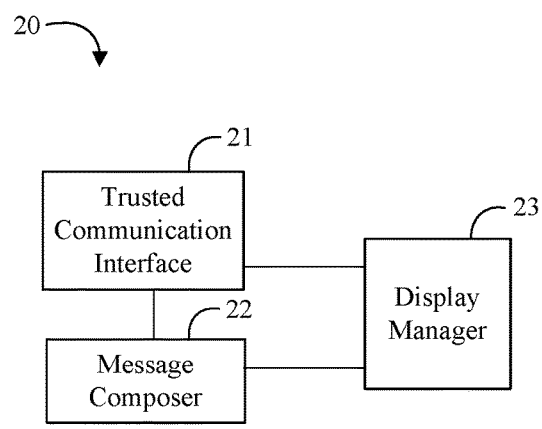
FIG. 2 is a block diagram of an example of a trusted vehicle message apparatus according to an embodiment.

Turning now to FIG. 2, a trusted vehicle messaging apparatus 20 may include a trusted communication interface 21 to receive a communication from one or more of an internal vehicle component or an external communication system, a message composer 22 communicatively coupled to the trusted communication interface 21 to compose a trusted message to be displayed in response to the received communication, and a display manager 23 communicatively coupled to the trusted communication interface 21 and the message composer 22 to manage a content to be displayed on one or more displays supported by a body of a vehicle. For example, the trusted communication interface 21 may also be configured to determine if the received communication is from a trusted source. The trusted message may include, for example, one or more of an informational message, an advertisement, an emergency message, a permit, or a receipt.

In some embodiments of the trusted vehicle message apparatus 20, the display manager 23 may be further configured to determine a position of a viewer relative to the one or more displays and to change a readable direction of the display in accordance with the determined positioned of the viewer relative to the one or more displays. As described in more detail below, the display manager 23 may also be configured to darken all or a portion of the one or more displays to reduce a perceived brightness of a bright light source. In some embodiments, the display manager 23 may also be configured to determine if a viewer proximate to the one or more displays is a trusted viewer and to prevent the display of the trusted message if the viewer is not determined to be a trusted viewer. For example, the display manager 23 may also be configured to discontinue the display of the trusted message after one or more of an expiration of the trusted message, a period of elapsed view time, a communication received from the trusted viewer to indicate that the message no longer needs to be displayed, or the trusted viewer is determined to no longer be proximate to the display.

For example, non-limiting suitable example of vehicle applications for the trusted vehicle messaging apparatus 20 include an automobile, a truck, a bus, a motorcycle, a boat, an airplane, a helicopter, and a drone. Non-limiting examples of suitable display technologies for the trusted vehicle messaging apparatus 20 include LCD, LED display, OLED display, thin film display, projection display, and electronic ink display, including transparent displays and/or flexible displays.

The trusted vehicle message apparatus 20 may, for example, be integrated as part of an in-vehicle infotainment (IVI) system. Embodiments of an IVI system including the apparatus 20 may further include an advanced user interaction system including a wireless communication interface, interior touch screen display(s), 2D and/or 3D cameras, microphones and/or microphone arrays, occupant sensors, pressure sensors, temperature sensors, and/or other sensors. Embodiments of the apparatus 20 may receive information from the IVI system to establish trust with an occupant of the vehicle or a viewer outside the vehicle. For example, backup warning systems include proximity sensors that detect when objects or people are close to the vehicle. Similar proximity sensors may be located near display locations to determine if an outside viewer is near a display. In addition, or alternatively, cameras and image recognition may be utilized to determine the presence of a vehicle occupant or the proximity of an outside viewer. Facial recognition or other machine vision processing may further determine an identity of the occupant or viewer. Other example security measures may include fingerprint or other biometric recognition, gesture recognition (e.g. a particular gesture as a security code), voice recognition, speech recognition (e.g. a spoken password), or other user input such as entering a personal-identification-number (PIN) code on a touch screen or keypad (e.g. a keypad may be provided as a keyless entry system on a vehicle door).

Trust may also be established by the presence of a trusted device. For example, a wireless link may be established between the IVI system and a wireless device held by the owner/driver (or other trusted occupants or viewers). Many vehicles are equipped with key fobs that are linked to the vehicle security system to unlock doors and/or start the vehicle. The use or detected presence of such a device may establish an initial level of trust with the IVI system and the occupant or viewer. Another example of a trusted device may include a smart device (e.g. a smart phone) that can be wirelessly linked or paired to the IVI system for subsequent trusted communications. The recognition of a trusted smart device, which itself may require user authentication, may establish a relatively higher level of trust with the IVI system (e.g. as compared to a key fob device).

Embodiments of the trusted vehicle message apparatus 20 may support numerous levels of trust with each level requiring different amounts and/or types of authentication. For example, a message to be displayed may be tagged as "public" so that it is displayed at all times (or whenever the IVI system detects the presence of a viewer) with no level of trust required. Another message may be tagged as "parking" and is only displayed when the viewer is identified as a trusted viewer such as a parking attendant or enforcement officer. For example, the proximity of the parking attendant or enforcement officer may be detected by having them carry a trusted device that may be recognized as a device used for parking enforcement. This may be considered a medium level of trust because the parking receipt/permit reader fob may be widely distributed (although a record of a unique ID for each distributed reader fob may be stored by the IVI system whenever it is activated to provide a deterrent from misuse). Personal transactions or payments transaction may require a high level of trust and require additional authentication (e.g. as may be established through a smart device or through other user interactions with the IVI system).

Embodiments of each of the above communication interface 21, message composer 22, display manager 23, and other components of the IVI system may be implemented in hardware, software, or any combination thereof. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages.

Turning now to FIGS. 3A to 3D, a method 30 of trusted vehicle messaging may include receiving a communication from one or more of an internal vehicle component or an external communication system at block 31, composing a trusted message to be displayed in response to the received communication at block 32, and managing a content to be displayed on one or more displays supported by a body of a vehicle at block 33. For example, the method 30 may further include determining if the received communication is from a trusted source at block 34. The trusted message may include, for example, one or more of an informational message, an advertisement, an emergency message, a permit, or a receipt at block 35.

Some embodiments of the method 30 of trusted vehicle messaging may further include determining a position of a viewer relative to the one or more displays at block 36, and changing a readable direction of the display in accordance with the determined positioned of the viewer relative to the one or more displays at block 37. The method 30 may also include darkening all or a portion of the one or more displays to reduce a perceived brightness of a bright light source at block 38.

Some embodiments of the method 30 may further include determining if a viewer proximate to the one or more displays is a trusted viewer at block 39, and preventing the display of the trusted message if the viewer is not determined to be a trusted viewer at block 40. For example, the method 30 may also include discontinuing the display of the trusted message after one or more of an expiration of the trusted message, a period of elapsed view time, a communication received from the trusted viewer to indicate that the message no longer needs to be displayed, or the trusted viewer is determined to no longer be proximate to the display at block 41.

The method 30 may be implemented in a trusted vehicle message system or apparatus such as, for example, system 10 or apparatus 20 described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object oriented programming language such as JAVA, SMALLTALK, C++ or the like and conventional procedural programming languages, such as the "C" programming language or similar programming languages. For example, the method 30 may be implemented on a computer readable medium as described in connection with Examples 18 to 24 below.

Advantageously, embodiments described herein may solve a problem of communicating with people outside a vehicle without resorting to writing a note on a piece of paper (e.g. and sticking it to the vehicle, putting it on the dashboard, or leaving it under a windshield wiper). Specifically, embodiments may provide a system, an apparatus, and/or a method of trusted communication on behalf of the vehicle owner/driver with people and systems around the car. For example, an embodiment may use a smartphone application to generate a secure document or message that can be displayed on a vehicle surface that is visible from outside the vehicle. On the smartphone side, secure authentication and communication techniques are known such as those that provide payment applications (e.g. APPLE PAY and various wallet apps for IPHONE operating system (IOS), ANDROID PAY and various wallet apps for the ANDROID operating system). Advantageously, embodiments of a trusted vehicle message system may extend these secure authentication and communication techniques to the vehicle.

Turning now to FIGS. 4A through 4D, a car 50 may include an embodiment of a trusted vehicle message system including a transparent flexible OLED display 51 overlaid onto the front windshield 52 of the vehicle (see FIG. 4B). The display 51 may alternatively be affixed to any surface where it can be positioned to be readable from outside the car 50. For example, parking receipts (see FIG. 4D) may be placed curbside on the door glass 53. An additional or alternative display 54 may be overlaid on the door glass 53 (see FIG. 4C). Additional or alternative displays $D_1$ through $D_N$ may be overlaid or affixed to additional or alternative example exterior body parts such as a bumper 55, a fender 56, a hood 57, an outside mirror 58, and a pillar (not shown). For example, the display 54 may display a parking fee receipt (see FIG. 4D).

Some embodiments of a trusted vehicle message system may advantageously provide ways of displaying secure receipts and trusted messages, text and graphics onto a surface of the vehicle to communicate with the people and systems outside the car. Additionally, some embodiments may provide a temporal experience so that the display of information goes away when no longer needed.

Embodiments may be better understood through example usage scenarios. In one example usage scenario, the driver has arrived at her destination in the city. She has the option to park in a parking garage or at a curbside spot. Her car navigation system informs her that since her appointment is only an hour long, it will be cheaper and quicker to park at the curb. Upon parking, the car automatically pays for one hour of parking (e.g. through a cloud service) and displays an electronic receipt on the transparent thin film display on the windshield or the flat screen display on the door glass (e.g. or both displays). If the driver's meeting runs long, the car will automatically pay for extended parking. At 6 pm, paid parking turns to free parking, and the receipt on the dash fades away. Advantageously, embodiments of the trusted vehicle message system may improve vehicle security. For example, if a parking receipt/permit only displays to enforcement personnel, a thief may not determine if the vehicle is for a visitor versus a resident, or how long the driver might be away from the vehicle.

In accordance with some embodiments, the trusted vehicle message system may be configured to change the readable direction of the display. For example, the display may be a flexible, transparent OLED display affixed to the windshield. In some embodiments, the connections for the display may be positioned out of view (e.g. behind the windshield frame) and the display may be substantially frameless so that the view through the windshield is not substantially impeded when the display is transparent. When a message or image is displayed, it may be viewed from both inside and outside the car. Advantageously, embodiments of the trusted vehicle message system may determine if the viewer is inside or outside the car and change the readable direction of the display accordingly.

In the example above, after the driver has paid for parking, the receipt may first display inside the car reading from left to right relative to the driver for the driver to confirm that the receipt is in order (e.g. the receipt may appear to be reversed or mirrored relative to a viewer outside the car). When the driver leaves the car, the system may reverse the reading direction so that the receipt now reads normally to a viewer outside the car. Advantageously, in accordance with some embodiments of a trusted vehicle message system, the position of the viewer relative to one or more of the displays may be determined automatically and the system may automatically change the readable direction of the display in accordance with the determined positioned of the viewer relative to the one or more displays. In addition, or alternatively, the system may change the readable direction of a display based on user input (e.g. the user says "flip display").

In another example usage scenario, the owner's car is often used by her twin daughters to drive to school. The owner has replaced the high school parking tag that used to dangle from the rear view mirror with a new electronic parking permit. The car recognizes when it is parked at school and displays the tag on the windshield whenever the car is parked at school. At the end of the school year, the tag expires and is no longer displayed.

In another example usage scenario, the driver likes to camp and hike in a remote area when she has a free weekend. She is often away overnight. Since cellphone coverage is spotty on the mountain, hikers often leave notes on their dash to inform others how long they will be away. Instead of leaving paper notes, the driver uses a note that is displayed on her windshield. She notes when she expects to return and a phone number to call if she hasn't returned by then. The note is only displayed when a viewer is detected to be near the car, advantageously saving power when no one is viewing the note.

In another example usage scenario, when the driver purchased her car, she opted for a feature that displays information for first responders in case of emergency. If the driver is ever in an accident and incapacitated, information is displayed on the windshield that includes the number of occupants, key medical history that could be important on the scene, contact information and data on the severity of the impact.

In another example embodiment, displays may overlay all glass windshield and door glass surfaces on the car. The displays may be made to turn opaque and reflect heat away from the vehicle, which advantageously lowers the interior temperature of the vehicle and provides privacy for the interior of the vehicle (e.g. to deter theft). Advantageously, embodiments of the trusted vehicle message system may improve vehicle and/or occupant security. If the display blacks out the windows, then a thief may not determine if a person is in the car or if a purse or electronic device was left on a seat.

In another example embodiment, a display may overlay the front windshield, a portion of which may be made semi-opaque to provide glare reduction from the setting sun (e.g. like a visor) and car headlights. For example, an IVI system may include a sophisticated vehicle computer system with inward and outward facing cameras, microphone arrays, and/or other sensors. The outward facing camera may be used to identify bright light sources outside the vehicle, such as the sun or oncoming headlights, which may impede the driver's vision. The inward facing camera may be used to determine the driver's eye position. The vehicle computer may then determine what portion of the windshield display to darken or make opaque or semi-opaque to reduce the perceived brightness of the light source outside the vehicle. In addition, or alternatively, the microphone array may determine the position of the driver's mouth (e.g. from a previously detected spoken command) and estimate the position of the driver's eyes based on the position of the mouth. In addition, or alternatively, a proximity sensor may determine the position of the top of the driver's head and estimate the eye position therefrom. In addition, or alternatively, the driver may input a request to or command to the IVI system to have the display function as a visor or light block. For example, the user may say commands like "visor on," "adjust visor up," "adjust visor down," "visor smaller," and "visor bigger," etc. Advantageously, the IVI machine vision system may precisely determine the apparent size and position of the bright light source on the display relative to the driver's eyes and darken a relatively small area of the display corresponding to the size of the light source (or slightly larger) such that the driver's vision is not impeded more than needed.

In another example embodiment, a display may be located near a license plate area. The trusted vehicle message system may automatically pay for, update, and display vehicle registration information (or other appropriate information for the license plate area).

In another example embodiment, the driver/owner may set a PIN code to unlock viewing of a trusted message. The intended viewer can link or pair with the IVI system and enter the PIN through their smartphone. The owner/driver may independently provide the trusted viewer with the PIN code (e.g. by a smartphone text message).

In another example, the vehicle trusted message system may display bumper sticker messages (e.g. at the owner/driver's discretion) or advertisements on the exterior vehicle displays. For example, the owner may agree to a lower, subsidized vehicle cost by agreeing to permit advertisements on the exterior displays. For example, when parked in a commercial area the IVI system may use a location subsystem such as a GPS to identify local businesses to pay to advertise on the exterior displays of the vehicle. The advertising content may be authenticated and communicated over a short range or long range (e.g. cellular) wireless communication system to the IVI system.

Turning now to FIGS. 5A to 5D, an embodiment of a trusted vehicle message system 60 may include a smart device 61 (e.g. a smartphone, see FIG. 5A), a computer 62 in the vehicle to determine what and when to display information or change the display opacity, etc. (e.g. an IVI system, see FIG. 5B), one or more displays 63 on one or more display surfaces 64 on the vehicle (e.g. glass surfaces, see FIGS. 5C and 5D), and software to allow the smart device 61 and/or the car computer 62 to determine what to display on the respective surfaces 64. Advantageously, the car computer 62 may provide a method to securely display information obtained from the phone and/or from onboard sensors.

The car computer 62 may also determine when and for how long to display the information. In some embodiments of the system 60, the display 63 may be a transparent display and the car computer 62 may toggle the display 63 between a transparent mode and a display mode. In some embodiments of the system 60, the image and/or data to be displayed on the displays 63 may originate from a phone application which is communicating with the cloud to make payments and act on behalf of the owner/driver.

Figure 5A:
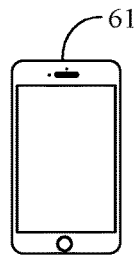
FIG. 5A is an illustration of an example of a smartphone according to an embodiment.
Figure 5B:
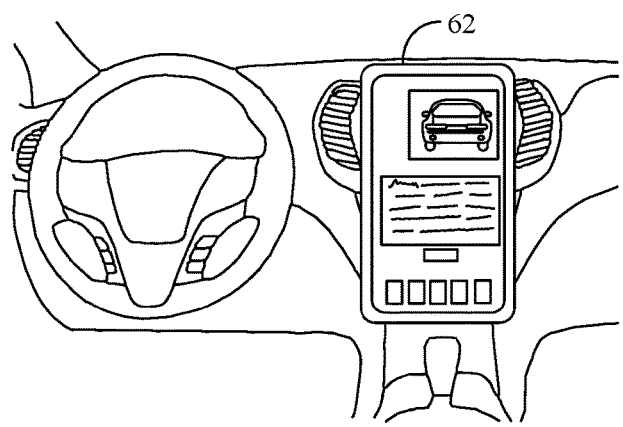
FIG. 5B is an illustration of a car dashboard including an in-vehicle-infotainment system according to an embodiment.
Figure 5C:
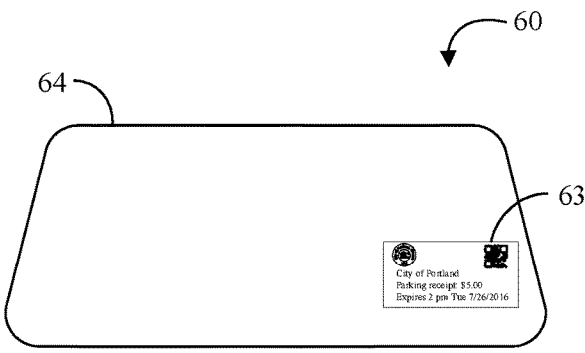
FIG. 5C is an illustration of an example of a vehicle windshield according to an embodiment.
Figure 5D:
FIG. 5D is an illustration of an example of a display device according to an embodiment.

Some embodiments may not require the smart device 61 or a cloud connection to instantiate various usages of the system 60. For example, depending on the size of the display (e.g. the whole windshield), the car itself could determine when to turn the display opaque (e.g. based on the car being turned off for security or privacy and/or a heat sensor indicating that heat reflection is warranted). When not in use, the display area may become transparent or semi-transparent. Embodiments may find utility in various number of displays and various display sizes. In the example of FIG. 5C, the display 63 may be located in the lower left corner of the windshield 64 (from the driver's perspective). Other embodiments may locate a display along the top of the windshield 64 or even the entire windshield 64. Some embodiments may use trusted messages to implement a heads-up display (HUD) over part or all of the windshield 64.

Additional Notes and Examples:

Example 1 may include a trusted vehicle message system, comprising a vehicle body having one or more body parts, one or more displays supported by the one or more body parts of the vehicle body and positioned to be readable from outside the vehicle body, and a vehicle computer disposed inside the vehicle body, the vehicle computer including a communication interface to receive a communication from one or more of an internal vehicle component or an external communication system, a message composer communicatively coupled to the communication interface to compose a message to be displayed in response to the received communication, and a display manager communicatively coupled to the communication interface, the message composer, and the one or more displays to manage a content to be displayed on the one or more displays.

Example 2 may include the trusted vehicle message system of Example 1, wherein the one or more body parts includes a curved windshield and wherein the one or more displays includes a substantially transparent flexible organic light emitting diode (OLED) display affixed to the curved windshield.

Example 3 may include the trusted vehicle message system of Example 2, wherein the flexible OLED display covers substantially an entire surface of the curved windshield.

Example 4 may include a trusted vehicle messaging apparatus, comprising a trusted communication interface to receive a communication from one or more of an internal vehicle component or an external communication system, a message composer communicatively coupled to the trusted communication interface to compose a trusted message to be displayed in response to the received communication, and a display manager communicatively coupled to the trusted communication interface and the message composer to manage a content to be displayed on one or more displays supported by a body of a vehicle.

Example 5 may include the trusted vehicle messaging apparatus of Example 4, wherein the trusted communication interface is to determine if the received communication is from a trusted source.

Example 6 may include the trusted vehicle messaging apparatus of Example 4, wherein the display manager is to determine a position of a viewer relative to the one or more displays and to change a readable direction of the display in accordance with the determined positioned of the viewer relative to the one or more displays.

Example 7 may include the trusted vehicle messaging apparatus of Example 4, wherein the display manager is to darken all or a portion of the one or more displays to reduce a perceived brightness of a bright light source.

Example 8 may include the trusted vehicle messaging apparatus of Example 4, wherein the display manager is to determine if a viewer proximate to the one or more displays is a trusted viewer and to prevent the display of the trusted message if the viewer is not determined to be a trusted viewer.

Example 9 may include the trusted vehicle messaging apparatus of Example 8, wherein the display manager is to discontinue the display of the trusted message after one or more of an expiration of the trusted message, a period of elapsed view time, a communication received from the trusted viewer to indicate that the message no longer needs to be displayed, or the trusted viewer is determined to no longer be proximate to the display.

Example 10 may include the trusted vehicle messaging apparatus of any of Examples 4 to 9, wherein the trusted message includes one or more of an informational message, an advertisement, an emergency message, a permit, or a receipt.

Example 11 may include a method of trusted vehicle messaging, comprising receiving a communication from one or more of an internal vehicle component or an external communication system, composing a trusted message to be displayed in response to the received communication, and managing a content to be displayed on one or more displays supported by a body of a vehicle.

Example 12 may include the method of trusted vehicle messaging of Example 11, further comprising determining if the received communication is from a trusted source.

Example 13 may include the method of trusted vehicle messaging of Example 11, further comprising determining a position of a viewer relative to the one or more displays, and changing a readable direction of the display in accordance with the determined positioned of the viewer relative to the one or more displays.

Example 14 may include the method of trusted vehicle messaging of Example 11, further comprising darkening all or a portion of the one or more displays to reduce a perceived brightness of a bright light source.

Example 15 may include the method of trusted vehicle messaging of Example 11, further comprising determining if a viewer proximate to the one or more displays is a trusted viewer, and preventing the display of the trusted message if the viewer is not determined to be a trusted viewer.

Example 16 may include the method of trusted vehicle messaging of Example 15, further comprising discontinuing the display of the trusted message after one or more of an expiration of the trusted message, a period of elapsed view time, a communication received from the trusted viewer to indicate that the message no longer needs to be displayed, or the trusted viewer is determined to no longer be proximate to the display.

Example 17 may include the method of trusted vehicle messaging of any of Examples 11 to 16, wherein the trusted message includes one or more of an informational message, an advertisement, an emergency message, a permit, or a receipt.

Example 18 may include a computer readable medium comprising a set of instructions, which when executed by a computing device, cause the computing device to receive a communication from one or more of an internal vehicle component or an external communication system, compose a trusted message to be displayed in response to the received communication, and manage a content to be displayed on one or more displays supported by a body of a vehicle.

Example 19 may include the computer readable medium of Example 18, comprising a further set of instructions, which when executed by a computing device, cause the computing device to determine if the received communication is from a trusted source.

Example 20 may include the computer readable medium of Example 18, comprising a further set of instructions, which when executed by a computing device, cause the computing device to determine a position of a viewer relative to the one or more displays, and change a readable direction of the display in accordance with the determined positioned of the viewer relative to the one or more displays.

Example 21 may include the computer readable medium of Example 18, comprising a further set of instructions, which when executed by a computing device, cause the computing device to darken all or a portion of the one or more displays to reduce a perceived brightness of a bright light source.

Example 22 may include the computer readable medium of Example 18, comprising a further set of instructions, which when executed by a computing device, cause the computing device to determine if a viewer proximate to the one or more displays is a trusted viewer, and prevent the display of the trusted message if the viewer is not determined to be a trusted viewer.

Example 23 may include the computer readable medium of Example 22, comprising a further set of instructions, which when executed by a computing device, cause the computing device to discontinue the display of the trusted message after one or more of an expiration of the trusted message, a period of elapsed view time, a communication received from the trusted viewer to indicate that the message no longer needs to be displayed, or the trusted viewer is determined to no longer be proximate to the display.

Example 24 may include the computer readable medium of any one of Examples 18 to 23, wherein the trusted message includes one or more of an informational message, an advertisement, an emergency message, a permit, or a receipt.

Example 25 may include a trusted vehicle message apparatus, comprising means for receiving a communication from one or more of an internal vehicle component or an external communication system, means for composing a trusted message to be displayed in response to the received communication, and means for managing a content to be displayed on one or more displays supported by a body of a vehicle.

Example 26 may include the trusted vehicle message apparatus of Example 25, further comprising means for determining if the received communication is from a trusted source.

Example 27 may include the trusted vehicle message apparatus of Example 25, further comprising means for determining a position of a viewer relative to the one or more displays, and means for changing a readable direction of the display in accordance with the determined positioned of the viewer relative to the one or more displays.

Example 28 may include the trusted vehicle message apparatus of Example 25, further comprising means for darkening all or a portion of the one or more displays to reduce a perceived brightness of a bright light source.

Example 29 may include the trusted vehicle message apparatus of Example 25, further comprising means for determining if a viewer proximate to the one or more displays is a trusted viewer, and means for preventing the display of the trusted message if the viewer is not determined to be a trusted viewer.

Example 30 may include the trusted vehicle message apparatus of Example 29, further comprising means for discontinuing the display of the trusted message after one or more of an expiration of the trusted message, a period of elapsed view time, a communication received from the trusted viewer to indicate that the message no longer needs to be displayed, or the trusted viewer is determined to no longer be proximate to the display.

Example 31 may include the trusted vehicle message apparatus of any of Examples 25 to 30, wherein the trusted message includes one or more of an informational message, an advertisement, an emergency message, a permit, or a receipt.

Embodiments are applicable for use with all types of semiconductor integrated circuit ("IC") chips. Examples of these IC chips include but are not limited to processors, controllers, chipset components, PLAs, memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A trusted vehicle message system, comprising:
a vehicle body having one or more body parts;
one or more displays supported by the one or more body parts of the vehicle body and positioned to be readable from outside the vehicle body; and
a vehicle computer disposed inside the vehicle body, the vehicle computer including:
a communication interface, implemented at least partly in one or more of configurable logic or fixed-functionality logic hardware, to receive a communication from one or more of an internal vehicle component or an external communication system;
a message composer, implemented at least partly in one or more of configurable logic or fixed-functionality logic hardware, communicatively coupled to the communication interface to compose a trusted message to be displayed in response to the received communication; and
a display manager, implemented at least partly in one or more of configurable logic or fixed-functionality logic hardware, communicatively coupled to the communication interface, the message composer, and the one or more displays to manage a content to be displayed on the one or more displays, wherein the display manager is to automatically determine, via a sensor, a position of a first viewer relative to the vehicle body,
wherein the display manager is to manage the content so that the trusted message is to be displayed on the one or more displays to be readable by the first viewer in response to the position of the first viewer being determined as inside the vehicle body regardless of whether a second viewer is identified by the system as being outside the vehicle body, and to automatically reverse a readable direction of the trusted message on the one or more displays in response to the position of the first viewer being determined as no longer inside the vehicle body so that the trusted message is displayed in the reversed readable direction irrespective of the position of the first viewer, that is outside the vehicle body, relative to the one or more displays and the vehicle body.

2. The trusted vehicle message system of claim 1, wherein the one or more body parts includes a curved windshield and wherein the one or more displays includes a substantially transparent flexible organic light emitting diode (OLED) display affixed to the curved windshield.

3. The trusted vehicle message system of claim 2, wherein the flexible OLED display covers substantially an entire surface of the curved windshield.

4. A trusted vehicle messaging apparatus, comprising:
a trusted communication interface, implemented at least partly in one or more of configurable logic or fixed-functionality logic hardware, to receive a communication from one or more of an internal vehicle component or an external communication system;
a message composer, implemented at least partly in one or more of configurable logic or fixed-functionality logic hardware, communicatively coupled to the trusted communication interface to compose a trusted message to be displayed in response to the received communication; and
a display manager, implemented at least partly in one or more of configurable logic or fixed-functionality logic hardware, communicatively coupled to the trusted communication interface and the message composer to manage a content to be displayed on one or more displays supported by a body of a vehicle, wherein the display manager is to automatically determine, via a sensor, a position of a first viewer relative to the vehicle,
wherein the display manager is to manage the content so that the trusted message is to be displayed on the one or more displays to be readable by the first viewer in response to the position of the first viewer being determined as inside the vehicle regardless of whether a second viewer is identified by the apparatus as being outside the vehicle, and to automatically reverse a readable direction of the trusted message on the one or more displays in response to the position of the first viewer being determined as no longer inside the vehicle so that the trusted message is displayed in the reversed readable direction irrespective of the position of the first viewer, that is outside the vehicle, relative to the one or more displays and the vehicle.

5. The trusted vehicle messaging apparatus of claim 4, wherein the trusted communication interface is to determine if the received communication is from a trusted source.

6. The trusted vehicle messaging apparatus of claim 4, wherein the display manager is to:
determine an eye position of a viewer; and
darken a portion of the one or more displays based on the eye position so as to change the portion from a transparent state to an opaque state or semi-opaque state to reduce a perceived brightness of a bright light source by a reduction or prevention of light transmission from the bright light source through the portion.

7. The trusted vehicle messaging apparatus of claim 4, wherein the display manager is to:
identify a tag associated with the trusted message, wherein the tag corresponds to a content of the trusted message and is associated with a level of trust to view the trusted message;
determine when a third viewer is proximate to the one or more displays;
determine whether authentication is required to display the trusted message based on the level of trust;
when authentication is not required, automatically display the trusted message in the reversed readable direction on the one or more displays without authentication; and
when authentication is required, determine if the third viewer is a trusted viewer based on whether the third viewer satisfies the level of trust, prevent the display of the trusted message if the third viewer is not determined to be the trusted viewer and allow the display of the trusted message in the reversed readable direction on the one or more displays if the third viewer is determined to be the trusted viewer.

8. The trusted vehicle messaging apparatus of claim 7, wherein when the trusted message is to be displayed by the one or more displays, the display manager is to discontinue the display of the trusted message after one or more of an expiration of the trusted message, a period of elapsed view time, a communication received from the trusted viewer to indicate that the trusted message no longer needs to be displayed, or the trusted viewer is determined to no longer be proximate to the display.

9. The trusted vehicle messaging apparatus of claim 4, wherein the trusted message includes one or more of an informational message, an advertisement, an emergency message, a permit, or a receipt.

10. The trusted vehicle messaging apparatus of claim 4, wherein the sensor is a microphone array.

11. The trusted vehicle messaging apparatus of claim 4, wherein the display manager is to manage the content so that the trusted message is only displayed by the one or more displays when a viewer is identified, by the display manager, as being proximate to the one or more displays.

12. The trusted vehicle messaging apparatus of claim 4, wherein the display manager is to manage the content so that another trusted message is to be displayed in response to an identification, by the display manager, of an occurrence of a predetermined event.

13. A method of trusted vehicle messaging, comprising:
receiving a communication from one or more of an internal vehicle component or an external communication system;
composing a trusted message to be displayed in response to the received communication;
managing a content to be displayed on one or more displays supported by a body of a vehicle;
automatically determining, via a sensor, a position of a first viewer relative to the vehicle;
displaying the trusted message on the one or more displays to be readable by the first viewer in response to the position of the first viewer being determined as inside the vehicle regardless of whether a second viewer is identified as being outside the vehicle; and
automatically reversing a readable direction of the trusted message on the one or more displays in response to the position of the first viewer being determined as no longer inside the vehicle so that the trusted message is displayed in the reversed readable direction irrespective of the position of the first viewer, that is outside the vehicle, relative to the one or more displays and the vehicle.

14. The method of trusted vehicle messaging of claim 13, further comprising:
determining if the received communication is from a trusted source.

15. The method of trusted vehicle messaging of claim 13, further comprising:
determining an eye position of a viewer; and
darkening a portion of the one or more displays based on the eye position by changing the portion from a transparent state to an opaque state or semi-opaque state to reduce a perceived brightness of a bright light source by reducing or preventing light transmission from the bright light source through the portion.

16. The method of trusted vehicle messaging of claim 13, further comprising:
identifying a tag associated with the trusted message, wherein the tag corresponds to a content of the trusted message and is associated with a level of trust to view the trusted message;
determining when a third viewer is proximate to the one or more displays;
determining whether authentication is required to display the trusted message based on the level of trust;
when authentication is not required, automatically displaying the trusted message in the reversed readable direction on the one or more displays without authentication; and
when authentication is required:
determining if the third viewer is a trusted viewer based on whether the trusted viewer satisfies the level of trust;
preventing the display of the trusted message if the third viewer is not determined to be the trusted viewer; and
allowing the display of the trusted message in the reversed readable direction on the one or more displays if the third viewer is determined to be the trusted viewer.

17. The method of trusted vehicle messaging of claim 16, further comprising:
when the trusted message is displayed, discontinuing the display of the trusted message after one or more of an expiration of the trusted message, a period of elapsed view time, a communication received from the trusted viewer to indicate that the trusted message no longer needs to be displayed, or the trusted viewer is determined to no longer be proximate to the display.

18. The method of trusted vehicle messaging of claim 13, wherein the trusted message includes one or more of an informational message, an advertisement, an emergency message, a permit, or a receipt.

19. A non-transitory computer readable storage medium comprising a set of instructions, which when executed by a computing device, cause the computing device to:
receive a communication from one or more of an internal vehicle component or an external communication system;
compose a trusted message to be displayed in response to the received communication;
manage a content to be displayed on one or more displays supported by a body of a vehicle;
automatically determine, via a sensor, a position of a first viewer relative to the vehicle;
display the trusted message on the one or more displays to be readable by the first viewer in response to the position of the first viewer being determined as inside the vehicle regardless of whether a second viewer is identified as being outside the vehicle; and
automatically reverse a readable direction of the trusted message on the one or more displays in response to the position of the first viewer being determined as no longer inside the vehicle so that the trusted message is displayed in the reversed readable direction irrespective of the position of the first viewer, that is outside the vehicle, relative to the one or more displays and the vehicle.

20. The non-transitory computer readable storage medium of claim 19, comprising a further set of instructions, which when executed by a computing device, cause the computing device to:
determine if the received communication is from a trusted source.

21. The non-transitory computer readable storage medium of claim 19, comprising a further set of instructions, which when executed by a computing device, cause the computing device to:
determine an eye position of a viewer; and
darken a portion of the one or more displays based on the eye position so as to change the portion from a transparent state to an opaque state or semi-opaque state to reduce a perceived brightness of a bright light source by a reduction or prevention of light transmission from the bright light source through the portion.

22. The non-transitory computer readable storage medium of claim 19, comprising a further set of instructions, which when executed by a computing device, cause the computing device to:
identify a tag associated with the trusted message, wherein the tag corresponds to a content of the trusted message and is associated with a level of trust to view the trusted message;

determine when a third viewer is proximate to the one or more displays;

determine whether authentication is required to display the trusted message based on the level of trust;

when authentication is not required, automatically display the trusted message in the reversed readable direction on the one or more displays without authentication; and when authentication is required:

determine if the third viewer is a trusted viewer based on whether the trusted viewer satisfies the level of trust;

prevent the display of the trusted message if the third viewer is not determined to be the trusted viewer; and allow the display of the trusted message in the reversed readable direction on the one or more displays if the third viewer is determined to be the trusted viewer.

23. The non-transitory computer readable storage medium of claim 22, comprising a further set of instructions, which when executed by a computing device, cause the computing device to:

when the trusted message is displayed by the one or more displays, discontinue the display of the trusted message after one or more of an expiration of the trusted message, a period of elapsed view time, a communication received from the trusted viewer to indicate that the trusted message no longer needs to be displayed, or the trusted viewer is determined to no longer be proximate to the display.

24. The non-transitory computer readable storage medium of claim 19, wherein the trusted message includes one or more of an informational message, an advertisement, an emergency message, a permit, or a receipt.

\* \* \* \* \*